(12) United States Patent
Baszucki

(10) Patent No.: US 8,839,153 B2
(45) Date of Patent: Sep. 16, 2014

(54) METHODS AND SYSTEM FOR MODIFYING PARAMETERS OF THREE DIMENSIONAL OBJECTS SUBJECT TO PHYSICS SIMULATION AND ASSEMBLY

(75) Inventor: David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 807 days.

(21) Appl. No.: 12/752,415

(22) Filed: Apr. 1, 2010

(65) Prior Publication Data

US 2011/0246949 A1    Oct. 6, 2011

(51) Int. Cl.
*G06F 3/048*    (2013.01)
*G06T 19/20*    (2011.01)
*G06F 17/50*    (2006.01)
*G06F 3/0484*    (2013.01)

(52) U.S. Cl.
CPC ........ *G06F 17/5086* (2013.01); *G06F 2217/02* (2013.01); *G06T 19/20* (2013.01); *G06F 2217/06* (2013.01); *G06F 3/04845* (2013.01); *G06T 2219/2004* (2013.01)
USPC .......................................................... 715/848

(58) Field of Classification Search
USPC .......................................................... 715/848
See application file for complete search history.

(56) References Cited

U.S. PATENT DOCUMENTS

| 6,426,745 B1 * | 7/2002 | Isaacs et al. | 345/419 |
| 6,781,597 B1 * | 8/2004 | Vrobel et al. | 345/619 |
| 2008/0010041 A1 * | 1/2008 | McDaniel | 703/1 |

* cited by examiner

*Primary Examiner* — Peiyong Weng
(74) *Attorney, Agent, or Firm* — Donald R. Boys; Central Coast Patent Agency, Inc.

(57) ABSTRACT

A set of atomic three dimensional objects that can be joined together in a workspace to form one or more complex three dimensional objects, each atomic object includes one or more object join features parameterized to enable joining with one or more parameterized join features of another atomic object in the set of objects, and a shape that may be modified according to one or more parametrically defined constraint attributes. A user may reshape and or resize one or more of the atomic three dimensional objects prior to joining the three dimensional objects together at the appropriate parameterized join features to form one or more of the complex three dimensional objects.

8 Claims, 9 Drawing Sheets

|          | Universal | Studs  | Inlet  | Weld   | Glue   | Smooth |
|----------|-----------|--------|--------|--------|--------|--------|
| Universal| Rigid     | Rigid  | Rigid  | Rigid  | Spring | Smooth |
| Studs    | Rigid     | –      | Rigid  | Rigid  | Spring | –      |
| Inlet    | Rigid     | Rigid  | –      | Rigid  | Spring | –      |
| Weld     | Rigid     | Spring | Spring | Spring | Spring | Rigid  |
| Glue     | Spring    | –      | –      | Rigid  | Spring | Spring |
| Smooth   | –         | –      | –      | Rigid  | Spring | –      |

METHODS AND SYSTEM FOR MODIFYING PARAMETERS OF THREE DIMENSIONAL OBJECTS SUBJECT TO PHYSICS SIMULATION AND ASSEMBLY

BACKGROUND OF THE INVENTION

1. Field of the Invention

The present invention is in the field of computer-aided modeling and pertains particularly to methods and apparatus for modifying and joining two or more atomic three dimensional objects to form a more complex three dimensional object.

2. Discussion of the State of the Art

In the art of computer-aided modeling, virtual environments (VEs) are created and exist for entertainment and educational purposes. Virtual reality games, three-dimensional toys, and other types of virtual environments exist where clients subscribe to a gamming site or a virtual world site and engage in interaction with the virtual presentations. One sector of this industry includes three dimensional educational games and toys for prepubescent and adolescent children. Among the offerings in this sector are building block games where younger kids can build complex three dimensional objects from atomic building block elements.

One problem with existing building block models is that the atomic elements (basic blocks) used to create the more complex objects like buildings, for example, have relatively fixed properties. Such fixed properties include traditional brick-based profile of length, height, and width, orientation with respect to other objects, and overall size and volume. Another problem with current building block games is that the selection of connector type or connecting surface type in most cases is very sparse if not limited to only a few types.

Therefore, what is clearly needed is a set of atomic three dimensional objects that are geometrically parameterized to enable modification of shape and size of the objects before joining the objects together, and include multiple types of joining features. Such a set of atomic building elements and a system for manipulating them would facilitate more tactile learning and solve the limitations described above.

SUMMARY OF THE INVENTION

The problem stated above is that capability to modify certain parameters of three dimensional objects serving as building blocks is desirable for a three dimensional building game, but many of the conventional means for modifying object parameters, are complex and cannot be performed by younger children. The inventors therefore considered functional elements of three dimensional object modeling systems, looking for elements that exhibit a propensity for functioning in a parameterized environment that could potentially be harnessed to provide a system for reshaping and resizing game building blocks but in a manner that would not create complexity.

Every virtual building game includes parts for building complex objects. However, these atomic elements are fixed in shape and size that are simulated relative to physics only as components of the larger more complex object created from them. One byproduct of these fixed building components is a one dimensional experience and complex objects that are limited in profile. Most such virtual building games employ a graphical user interface (GUI), various building components, and physics simulators to enable complex objects that are simulated relative to motion and other forces. Three dimensional atomic elements are typically part of such apparatus.

The present inventor realized in an inventive moment that if, at the point of assembly, building components or parts could be reshaped and/or resized through intuitive user input devices resulting in physics simulation of those modifications, more unique complex objects could be assembled and richer functionality might be achieved. The inventor therefore constructed a unique set of three dimensional, parameterized smart parts that allowed users to make certain modifications to those parts, but constrained such parameter modifications to conform to a range of alteration specified in a specific coordinate frame for the atomic object. A significant increase in complex object variation and functionality results with no significant complexity in building tools or methods introduced.

Accordingly, in an embodiment of the present invention, a set of atomic three dimensional objects that can be joined together in a workspace to form one or more complex three dimensional objects, each atomic object comprising, one or more object join features parameterized to enable joining with one or more parameterized join features of another atomic object in the set of objects, and a shape that may be modified according to one or more parametrically defined constraint attributes. A user may reshape and or resize one or more of the atomic three dimensional objects prior to joining the three dimensional objects together at the appropriate parameterized join features to form one or more of the complex three dimensional objects.

In one embodiment, one or more object join features is a surface containing an alignment grid for constraining rotation angle of joined parts relative to one another. In one embodiment, parameterization includes provision and display of virtual resize handles for resizing an object along one or more axis' of the object. In one embodiment, parameterization includes provision and display of one or more auxiliary virtual resize handles for modifying thickness or depth without affecting the overall major dimensions of an object.

In one embodiment, parameterization includes provision and display of one or more auxiliary virtual resize handles for modifying shape without affecting the overall major dimensions of an object. In one embodiment, one or more of the objects are shapeable using a virtual rotation handle displayed proximally to one or more object surfaces of individual objects, the one or more surfaces limitedly rotable about an X or Y axis intersecting at a center point projected on each rotable surface. In one embodiment, resize amount is controlled by sticky integer. In a variation of this embodiment, resize amount is limited to a subset of integer values corresponding to parts that are available in the virtual environment. In one embodiment, trigonometric calculations are made to complete object dimensioning during surface rotation to maintain one or more original symmetry features of the object.

According to another aspect of the invention, a system is provided for joining three dimensional atomic objects from a set of three dimensional objects to form one or more complex three dimensional objects. The system includes a workspace hosted by a server and accessible by a browser application for display, the workspace accessible by computer input device, a repository coupled to the server, the repository adapted to contain and serve the objects and associated data into the workspace, and an object editing interface including one or more virtual resize handles and one or more virtual rotation handles associated with each atomic object, the handles manipulatable using the computer input device. A user working within the workspace may resize and or reshape the three dimensional atomic objects according to pre-existing constraints, including integer and integer subset movement constraints and wherein the objects may be aligned for join in a sever-assisted manner.

In one embodiment, individual ones of the objects have one or more object surfaces containing an alignment grid for constraining rotation angle of joined parts relative to one another. In one embodiment, virtual resize handles include one or more handles for resizing an object along one or more axis' of the object and one or more handles for changing thickness or depth of an object.

In one embodiment, the system further includes a text-based interface for enabling text-based resizing, reshaping, and rotation of one or more objects in the set of objects.

In one aspect, the one or more handles for shape modification functions to enable limited rotation of an object surface about an X or Y axis parallel to the surface plane and centered on the surface relative to surface boundary.

According to another aspect of the invention, in a system for joining three dimensional atomic objects from a set of three dimensional objects, the system including a computer-based workspace hosted by a server and accessible by a browser application for display, a method is provided for preparing individual ones of the atomic objects for a join operation including the steps (a) in a server-hosted workspace highlighting an atomic object using a computer input device, (b) selecting a virtual object modification handle displayed as a result of (a) using the computer input device, (c) dragging the control in the appropriate axis direction to modify the atomic object, and (d) positioning the atomic object for a join operation with another atomic object.

In one aspect of the method, in step (a) the server-hosted workspace is an object editing interface accessible by browser application. In one aspect of the invention, in step (a) the computer input device is a two-dimensional mouse. In one aspect, in step (b) the virtual modification handle is a resizing handle used to resize the object along one of an X, Y, or Z axis of the object. In one aspect of the method, in step (b) the virtual modification handle is an auxiliary handle for resizing the depth or thickness of the object without affection overall major dimensioning of the object. In one aspect, in step (c) the axis is a rotational axis and can be one of X, Y, or Z axis'.

BRIEF DESCRIPTION OF THE DRAWING FIGURES

FIG. 7 is a table 700 illustrating various types of join features showing results of surface to surface join for the types listed.

DETAILED DESCRIPTION

Figure 1:
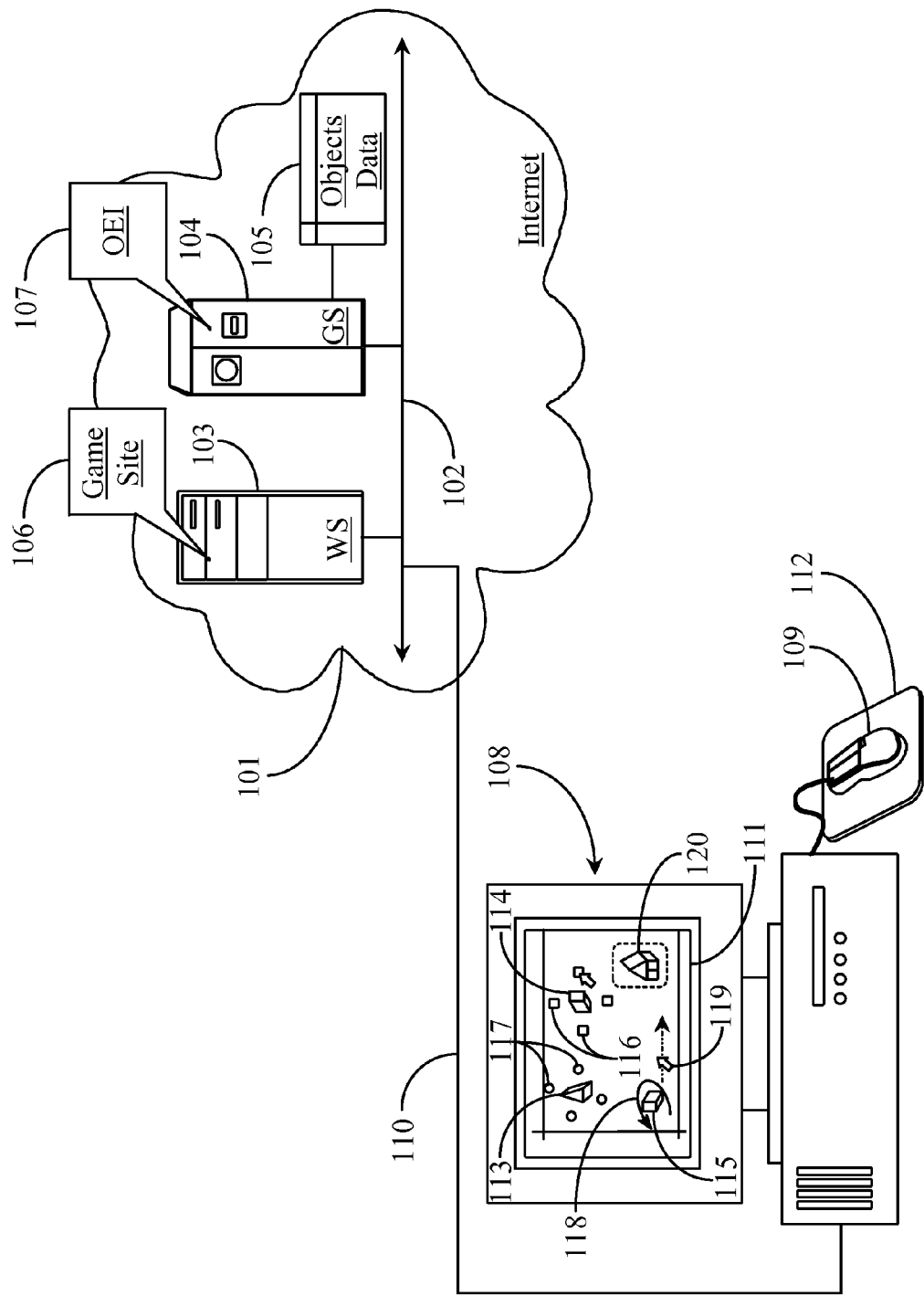
FIG. 1 is an architectural view of a user station engaged in playing a building game using three dimensional atomic building blocks according to an embodiment of the present invention.

The inventors provide a set of three dimensional objects with parameterized geometry that may be modified separately and used in a virtual building game to create more complex objects. The methods and apparatus of the present invention are described in enabling detail below using the following examples, which may represent more than one embodiment FIG. 1 is an architectural view of a user station 108 engaged in playing a building game using three dimensional atomic building blocks according to an embodiment of the present invention. User station 108 is in this example a personal computer having connection to the Internet network 101. Internet network 101 is further represented in this example by an Internet backbone 102, which represents all of the lines, equipment, and access points that make up the Internet as a whole, including connected sub-networks. Therefore, there are no geographic limitations to the practice of the present invention. In one embodiment, Internet 101 may instead be an enterprise wide-area-network (WAN) or a municipal area network (MAN) without departing from the spirit and scope of the present invention.

User station 108 may be a PC, Laptop, Notebook, personal digital assistant (PDA), a smart phone, or another computing appliance capable of accessing and navigating the Internet using a browser-based application. PC 108 is connected to backbone 102 in Internet 101 by an Internet access line 110. Access line 110 is a logical representation. PC 108 may connect to Internet 101 through an Internet Service Provider (ISP) using dial-up, cable-modem, broadband, digital subscriber line (DSL), satellite, or another Internet connection method. In this example PC 108 is logged into and in session with a Web server (WS) 103 within Internet 101. WS 103 has a digital medium provided thereon or coupled thereto that contains all of the data and software (SW) required to enable function as a Web server.

Web server 103 hosts a virtual-game Web site 106 provided by a gaming company and service provider. Game site 106 mixes gaming and social interaction primarily for young people. One of the game types offered through game site 106 is a building block game played mostly by young people, including children learning how to exercise their creativity in a safe online environment. Web site 106 provides registration, login facilities, and game selection. Users who enter games to play are redirected in this example to a game server (GS) 104 to play the games. GS 104 has a digital medium provided therein or coupled thereto that contains all of the SW and data required to enable server function as a game server. GS 104 is coupled to a data repository 105 adapted to store data relative to three dimensional game objects and associated data for all of the games that are accessible through the server. Other features of GS 104 include physics simulation capability such as through a rigid body dynamics simulator, and a network replication system for replicating game play statistics and results to all users engaged in game play through the server.

PC 108 has a browser-based window 111 open that displays an object editing interface (OEI) 107, which is resident on GS 104 and accessed by users who wish to create complex objects from atomic components during game play. OEI 107 enables users to select atomic three dimensional objects and to position those objects for assembling into more complex objects like buildings, castles, and any other complex structures that may be assembled from the atomic components. Atomic objects or "building components" are aggregated in sets for each game, so each game has its own set of objects that are used to build more complex three dimensional objects. In one embodiment individual ones of a set of atomic objects may be modified in constrained ways before assembling those objects together to form the more complex object.

OEI 107 illustrated as opened on PC 108 is being used at PC 108 to modify and rotate atomic building components to assemble a more complex three dimensional object. A first atomic object 113 is a wedge object. A second atomic object 114 is a rectangular block object. A third atomic object 115 is also a rectangular block object. PC 108 includes a computer input device 109, which is a computer mouse in this example. There may also be other input devices, such as a keyboard.

Computer mouse 109 operates with two degrees of freedom in the plane of mouse pad 112. The inventor is aware of more complex computer input devices including pointer devices that operate in 3 to six degrees of freedom, however these input devices are relatively expensive and complicated to use. Most game players subscribing to or registered with gaming site 106 have only two-dimensional pointer devices as input devices for their computers. Some may use a mouse ball, which will be transparent to the system.

In this example, users may modify atomic building components 113-115 before aligning them for a join operation to create a more complex object like house 120, for example. In this regard, intuitive user interface tools are provided in this embodiment to enable three dimensional manipulation of the objects on a two dimensional screen. Mechanisms for accomplishing this three dimensional object editing capability include an object resizing tool visualized as a set of resizing handles, such as handles 117 surrounding object 113. Object resizing may be allowed along one or more axes of an object. Resizing an object along an axis is termed axial resizing by the inventors.

In one embodiment object resizing is constrained by an integer scale or grid designed to only allow object sizing that does not result in an inability to assemble the resized object to another object. In this regard objects may be reshaped or resized according to an integer subset representing the actual part sizes allowed as opposed to a scaling operation where each integer on the scale is achievable.

Another object modification mechanism is an object reshaping tool visualized as a set of handles 116 surrounding object 114. Handles 116 may be interacted with by computer mouse (grab operation) illustrated by cursor arrow, and then may be moved according to integer constraints to re-shape object 114. Objects may also be rotated about their axis using an object rotation tool that uses a translation plane 119 and direction of translation to effect object rotation in a specified direction 118. Rotation of objects may also be constrained for simple alignment. These and other object manipulation tools may be provided as sets of interactive iconic handles provided about the object. A menu bar (not illustrated) may also be provided to enable selection of the appropriate iconic set of handles for performing a specific modification on an atomic object. In this regard, a user will first select an object, then the tool, and then do the manipulation.

Each atomic object includes at least one parameterized join feature surface that defines a type of connection for that surface. A connection for a surface may be one of studs, inlets, welds, and other joint types, as well as a universal join, a glue join, and a smooth join. In all embodiments, atomic object modification is physically simulated to produce the finished object resulting from the intended modification performed by a user on the atomic object. After atomic objects are assembled, the join configurations of those objects may be simulated relative to physics as a result of forces that the complex object might be subject to. For example loading two many atomic objects on one side of a complex object might result in the complex object tipping over, as the weight and change in center of gravity of the assembly is dynamically updated by the physics system. It is these types of reactions that make building games challenging and fun to play. The physics simulation system is always operative in this example, so the objects and assemblies are updated in real time in their positions and reactions to forces.

GS 104 simulates the actions of users on objects, and in a preferred embodiment assists users in completing modifications that result in successful assembly, and do not make an object unusable. Therefore, all of the object-editing tools are constrained by integer with respect to size, shape, and angle of rotation of objects. Parameterized geometries include specific types of connectors or "join features" that are parameterized, for example by specific pattern and size of connecting elements. Join features may include object surfaces. For example, a "studs" surface defines a specific pattern of parallel studs running under the surface of the object. Another surface texture might be nails where pre-positioned nails protruding from one object surface are nailed into the studs of the other object surface. This is simply a logical example and is not meant to describe any limitations.

Atomic objects must be rotated relative to one another so that their connecting or "join features" are aligned in the same plane and the rotational positions of the parts are aligned with respect to the specific join configuration "rules" for each part. As a user operating PC 108 manipulates the game atomic objects with various modification tools provided, GS 104 physically simulates the activity and constrains the activity according to a coordinate frame containing constrain integers like allowable rotation angles, for example. A physics simulation engine is used to make the calculations based on the movements of the user and the rules governing the atomic objects. If an action is not allowed for an object, the tool supporting that action will not be accessible relative to the selected object.

Conventional building games use fixed blocks that are not subject to physics simulation other than motion until they are assembled to one or more other atomic objects, wherein the complex object is physically simulated relative to strains and other forces subjected to the complex object. Enabling simulation at a level granular to the atomic object allows for more variation in simulated results for complex objects as modifications to atomic objects may singularly or collectively effect physics simulation of the more complex object.

Figure 2:
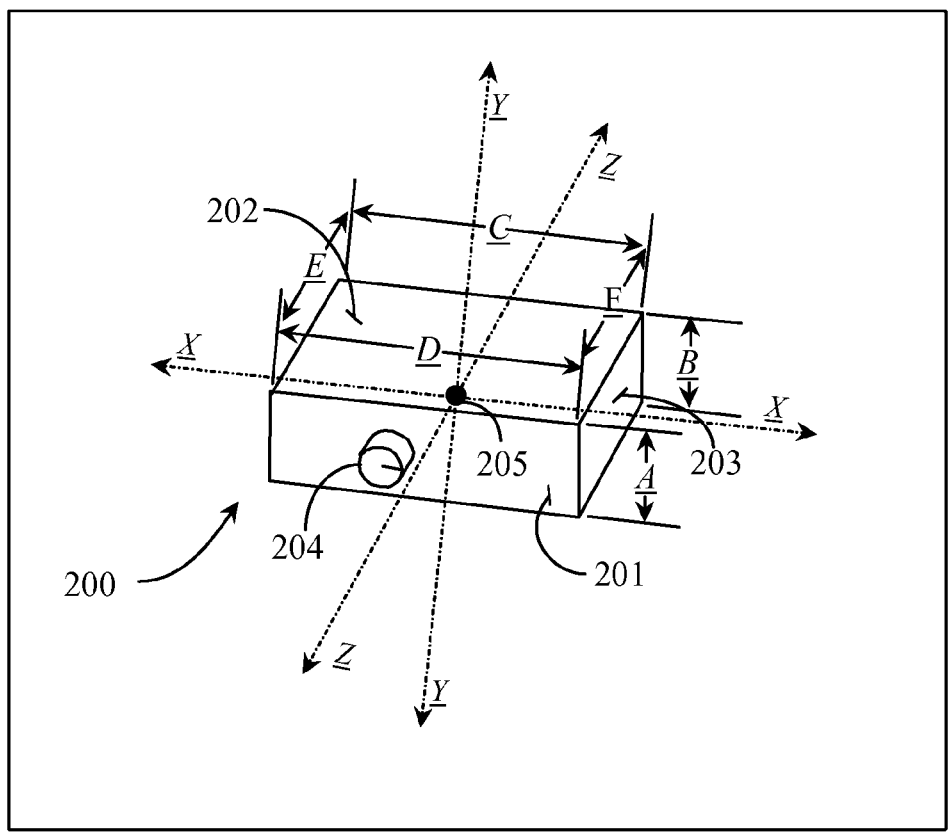
FIG. 2 is a perspective view of an atomic building block according to an embodiment of the present invention.

FIG. 2 is a perspective view of an atomic building block 200 according to an embodiment of the present invention. Atomic block 200 is rectangular in shape and has a button feature 204 on one surface of the part. Visible features in this view include a front surface 201, a top surface 202, and an end surface 203. Back bottom and opposite end surfaces are visible through part rotation with the rotational movement driven by pointer motion projected along a translation plane as illustrated further above in FIG. 1. Atomic object 200 has a center of mass 205 marking the intersection of the parts axes. There are three logical axes of rotation illustrated in this example, an X axis, a Y axis and a Z axis as known in the Cartesian system.

Individual ones or all of the features of atomic object 200 may have parameterized join configurations that enable the part to be assemble to one or more other parts. In one embodiment a user may modify object 200 by changing its shape relative to one or more dimensions. Height dimensions A and B might be changed in unison on one side of the part to form a wedge. The object might be resized along the Y axis to change the overall height dimension of the object. The length of one side of object 200 might be changed with respect to length C or length D of the object forming a trapezoidal object. Similar modification might be allowed relative to object width dimensions E and F. Object 200 might be resized along the X axis to lengthen the object or along the Z axis to widen the object.

For each of the described operations, different iconic manipulation handles are provided so that the user is always aware of what operation he or she is attempting to perform. In one embodiment, each side or facet of an atomic object may include a centered pivot point that is constrained to allow parallel planer rotation of one or more sides of the object to change the shape and appearance of the object. More about object reshaping and its effect of object dimension is described later in this specification.

Figure 3:
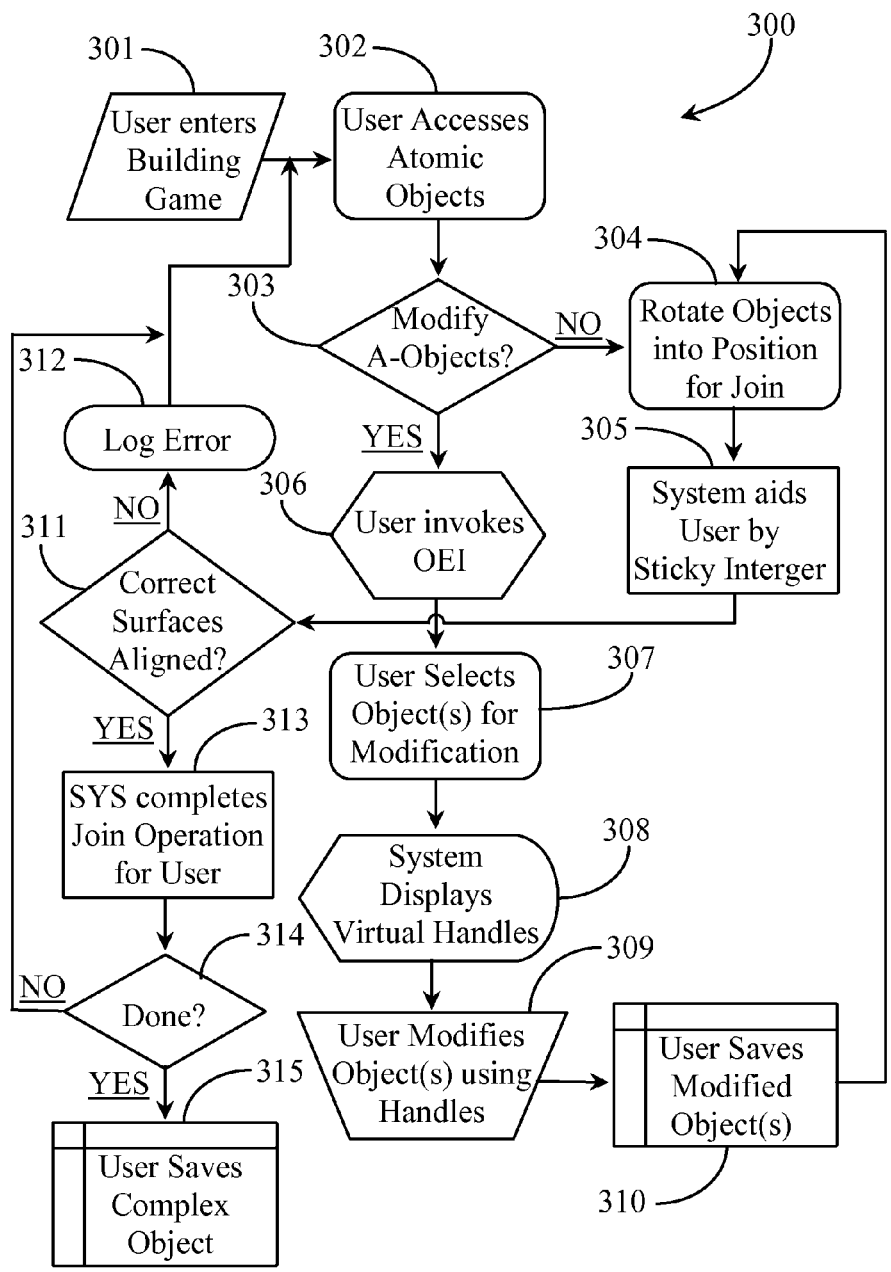
FIG. 3 is a process flow chart illustrating steps for site-assisted object manipulation and joining objects according to an embodiment of the present invention.

FIG. 3 is a process flow chart 300 illustrating steps for site-assisted object manipulation and joining objects according to an embodiment of the present invention. At step 301a user enters a building game by selecting the game to play after logging into a gaming site such as site 106 of FIG. 1. The game entered is served by a gaming server like GS 104 of FIG. 1. The user is connected to the game server the entire time the user is playing the game and when the user is manipulating, modifying objects, or creating or assembling objects. The building game includes a set of smart atomic objects that are used to build more complex objects. At step 302 the user may access atomic objects to build a more complex object or objects in the act of playing the game.

At step 303 the user determines whether or not to modify atomic objects. It is assumed herein that an object editing interface is provided for this purpose and that the user has it open. In one embodiment an editing interface shares the same space as the actual building process of the game and there is no visual distinction to the user other than the visible iconic handles which appear when the user attempt to make a change in shape or size of a part. In another embodiment, the user modifies parts in a separate window before including those parts as building blocks for creating more complex objects.

If at step 303 the user determines not to modify any atomic objects, at step 304 the user may rotate selected objects into position for joining the objects as part of regular game play activity. At step 305 the system aided by a physics simulation engine constrains the rotation angle of the parts relative to one another using a "sticky integer" technique allowing only certain angles of rotation to ensure alignment of join features in a same plane and single axis rotation of one part relative to another to ensure the proper alignment with respect to join surface configuration rules once the features are in a same plane of alignment.

The process proceeds to step 311 where the system determines if the correct join features are aligned. If the system determines that the aligned features are not correct for joining, the system may log an error at step 312 and the process loops back to step 302 where the user accesses atomic objects. If at step 311 the system determines that the object features are correctly aligned for joining, at step 313 the system completes the join operation for the user. At step 314 the user may determine if he or she is done assembling atomic objects. If the user is finished in step 314, then the user or system may save the complex object at step 315. In this case the complex object appears in the game landscape and may be placed by default or by the user in the virtual game space.

Referring now back to step 303, if the user determines to first modify atomic objects, at step 306 the user may invoke an object editing interface (OH), which may or may not be separate from the normal play space of the virtual building game. In one embodiment object editing is performed in a transparent layer over the game building space. At step 307 the user selects one or more objects for modification. In this step the user may select which available modification tool will be implemented to make a desired operation from a menu or toolbar. At step 308 the system displays the appropriate iconic set of handles for the desired operation. At step 309 the user modifies the object or objects using the supplied virtual handles. Step 309 may include a process similar to step 305 for sizing or reshaping where a sticky integer technique is used to constrain the operation according to a grid to ensure that the modified objects will still conform to surface join configuration rules.

At step 310 the user saves the modified object or objects. It is noted herein that the user may perform a number of sequential operations on a single atomic object. The user may also perform a single operation on a group of selected atomic objects in one embodiment. The process resolves back to step 304 where the user rotates the parts into suitable position for joining. The rest of the process follows steps 305, 311, 313, and 314 with negative at step 311 resulting in a loopback to step 302 and error logging. In the event of a user or system error, the system may notify the user via pop-up, TOAST, or other visual message that an error has occurred.

Figure 4:
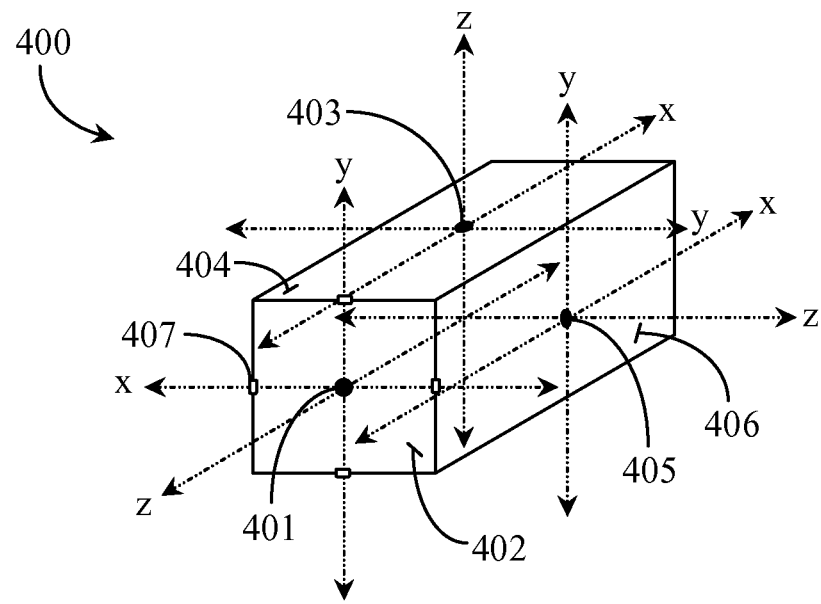
FIG. 4 is a perspective view of an atomic object with parameterized geometry according to an embodiment of the present invention.
Figure 5:
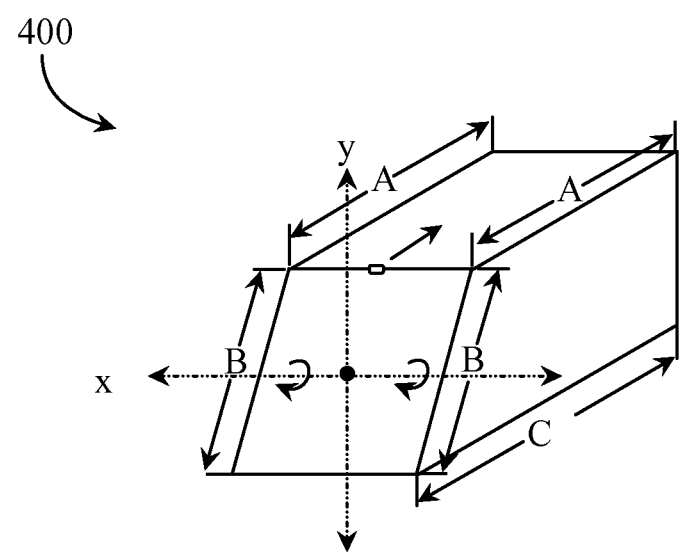
FIG. 5 is a perspective view of the object of FIG. 4 after shape modification according to an embodiment of the present invention.

FIG. 4 is a perspective view of an atomic object 400 with parameterized geometry according to an embodiment of the present invention. FIG. 5 is a perspective view of the object of FIG. 4 after shape modification according to an embodiment of the present invention. Referring now to FIG. 4, atomic object 400 begins as a rectangle in this example, but may be of another geometric profile. Building blocks known to the inventor and provided in various embodiments include blocks, spheres, and cylinders, and special shapes such as half pipes, window frames, wedges, and other shapes having both straight and arcurate features.

Height, length, and width dimensions of rectangular object 400 are not specifically called out but are assumed to be known by the system and are symmetrical with respect to like sides of the object. In this example rectangular building block 400 includes a pivot point located at the center position of each parameterized surface. Point 401 is at the center of surface 402, point 403 at the center of surface 404, and point 405 at the center of surface 406. For each surface the pivot point is the origin of the Cartesian arrangement of axes X, Y and Z for that surface, and the X and Y axes always lie in the plane of the surface.

X, Y, and Z axes are illustrated through each pivot point. The pivot point enables at least limited rotation of the surface of the part about the X axis, or the Y axis, but not about the Z axis for the surface. It is important to understand that when a user rotates one of the surfaces, it is that surface that rotates, not any other part of the block. The surface rotates, and dimensions are adjusted for that surface and other surfaces accordingly; and the edge dimensions of course change accordingly as well.

A user must first select a surface to rotate to alter the shape and dimensions of the block. This may be done in a variety of ways, such as by clicking on the desired surface for example. Once a surface is selected (assume surface 402 for this example), handles 407 appear, one at the midpoint of each edge of the surface selected. Only one of these handles is numbered in FIG. 4, for simplicity sake.

A further constraint placed on surface rotation may be that trigonometric dimensioning must be applied to the opposing sides of the object surface based on the angle of rotation, so that the original height of the object is maintained. Physics simulation makes the calculations based on the angle and the specified axis of the rotation (X or Y).

In this example, surface 402 is rotated about its X axis by grabbing a handle 407 as shown in FIG. 5 and moving the handle along the direction of the Z axis illustrated in FIG. 4. In this example rotating surface 402 about its X axis in its Z direction affects dimensions A, B, and C. Dimension A is shortened while dimension B and dimension C are lengthened proportionally and according to the trigonometric functions of the right triangle formed by the rotation angle. The surface rotation tool provides a convenient way to alter the shape of object 400. In another example, the rotation may occur along the opposite edge of the rotation handle, the rotation parallel to either the X or Y axis. It is noted herein that resizing an atomic object along an axis of rotation is termed axial rotation by the inventors.

Figure 6:
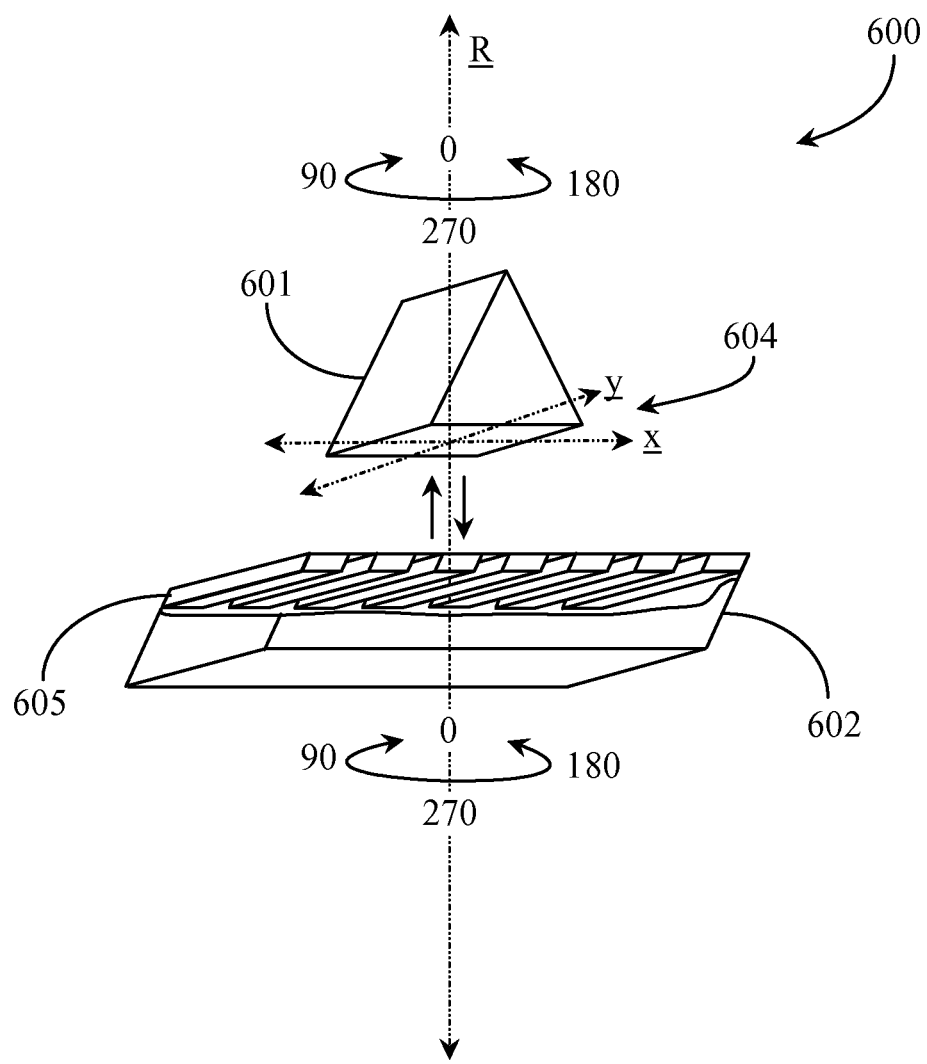
FIG. 6 is a perspective view of a join configuration according to an embodiment of the present invention.

FIG. 6 is a perspective view of a join operation according to an embodiment of the present invention. An object 601 is shown positioned over an object 602 such that their join features are aligned correctly in parallel planes for a joining operation. Object 602 has part of its exterior removed to illustrate a parameterized join feature, which in this case is a surface of "studs" 605 running parallel to one another and equally spaced apart. Object 601 is presumed to have a parameterized join surface (bottom surface) that is configured to connect with the studs surface. Aligning the parts features for join reduces the rotation axes of both parts to a single rotation axis R assuming the parts share the same vertical centerline.

Part 601 may be rotated relative to part 602 about rotation axis R in a constrained manner such that only rotated positions of 0 degrees, 90 degrees, 180 degrees, and 270 degrees are allowed for the two parts to be successfully joined. Part 601 may also be joined off center of part 602 at a given rotation along the X and Y axis of the join surface of the part in a constrained manner consistent with the rules of the join configuration. The parts are moved together in the direction of the arrows to complete the join operation. In one embodiment changing the size and/or shape of an object relative to another object before joining the objects might affect the constraints placed on the join configuration such that there is more or less constraint placed on how the parts may fit together. Such changes are automatically calculated by the system so that the join configuration follows the new constraint table accordingly. Rules of shape change and resize operations are tested for affect on join operations so that the latter is dynamically reconfigured as a result of simulating the former activity.

FIG. 7 illustrates a table 700 illustrating various types of join features showing results of surface to surface join for the types listed. Table 700 has rows and columns identifying various parameterized surface types including Universal; Studs; Inlet; Weld; Glue and Smooth. Other types of features may also be simulated like Snaps, Rivets, etc. For the intersection of each surface type in a row with a surface type in a column the nature of the join is shown at the intersection. For example, universal to universal results in a rigid connection. In this example the possible constraints properties are rigid and spring. A dash implies no simulation constraints on the join surface combination.

Figure 8:
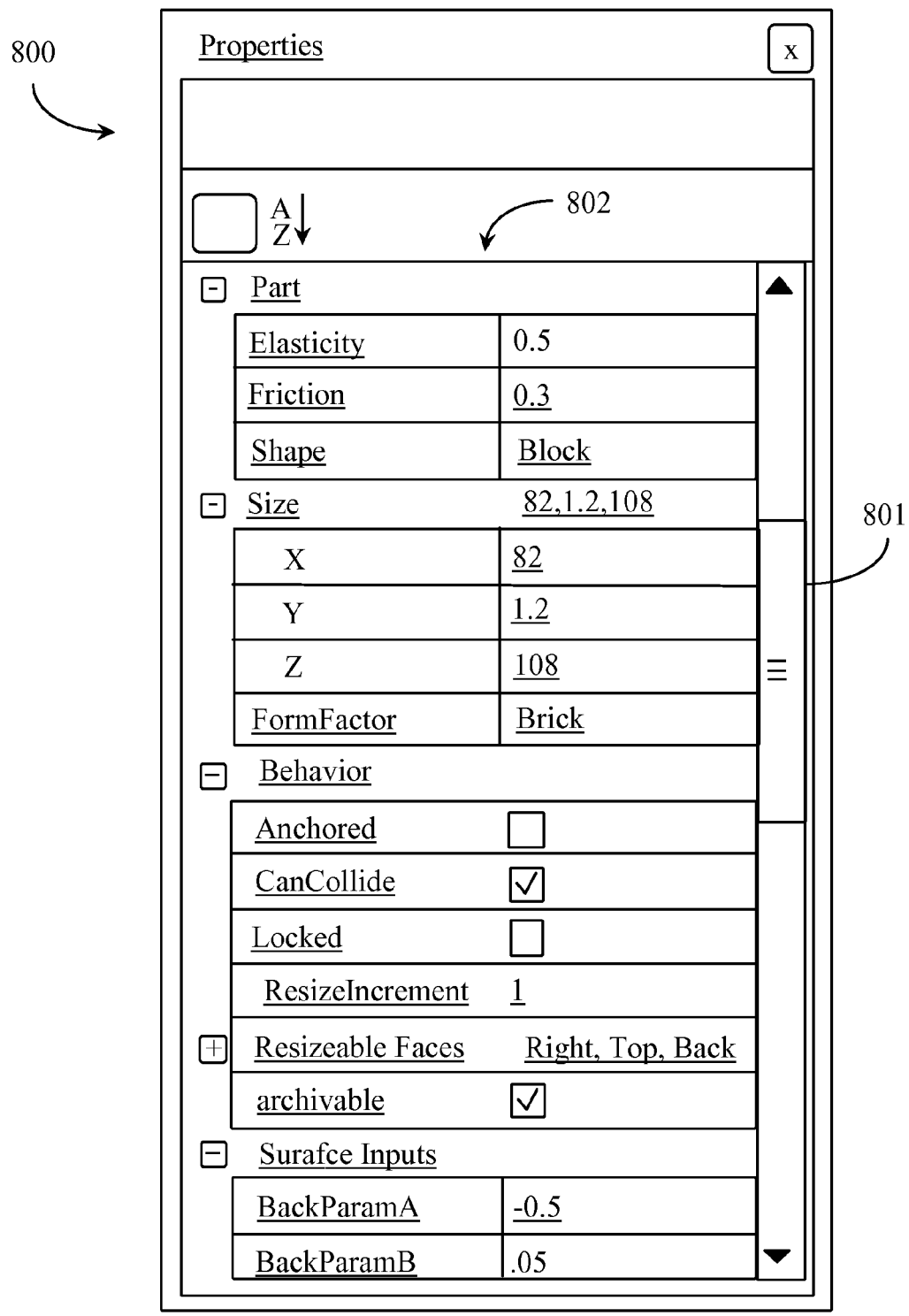
FIG. 8 is an exemplary screen shot of a text-based user interface for editing object properties.

FIG. 8 is an exemplary screen shot of a text-based user interface 800 for editing object properties. Interface 800 may be used in addition to or in place of graphic user interface tools for resizing and reshaping objects. Interface 800 includes a scroll bar 801 for scrolling up or down in the properties window 802. Each part has physical properties associated therewith such as elasticity and friction expressed as values and a basic shape such as a block. Each part has a size calculated in the X, Y, and Z directions, the size expressed by units of measure. An abstract form factor is given to each part to identify its form factor such as a brick, for example.

Each part has certain behaviors for simulation purposes, such as anchored and collision allowance (CanCollide). These behaviors may be locked for the part. A resizing increment may be specified. Each part may include a number of resizable features such as top surface, right surface, and back surface, for example. Each part may include surface inputs such as back parameter A and back parameter B expressed as values. Advanced users may call up text-based user interface 800 to make certain changes in a parts properties and behaviors as well as ordering new sizes and shapes for the part. Options that are not available for a specific part are grayed out in the display of the table.

Figure 9:
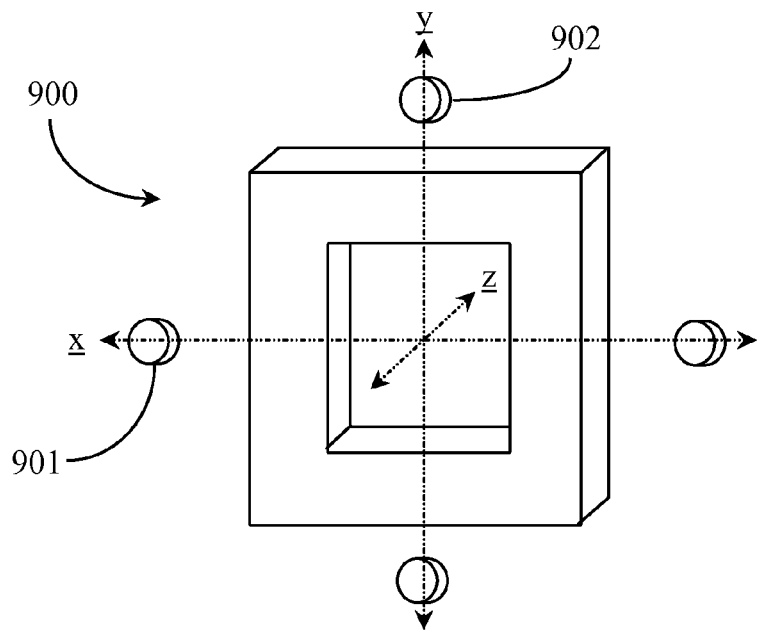
FIG. 9 is a perspective view of an atomic object with resizing handles according to an embodiment of the present invention.
Figure 10:
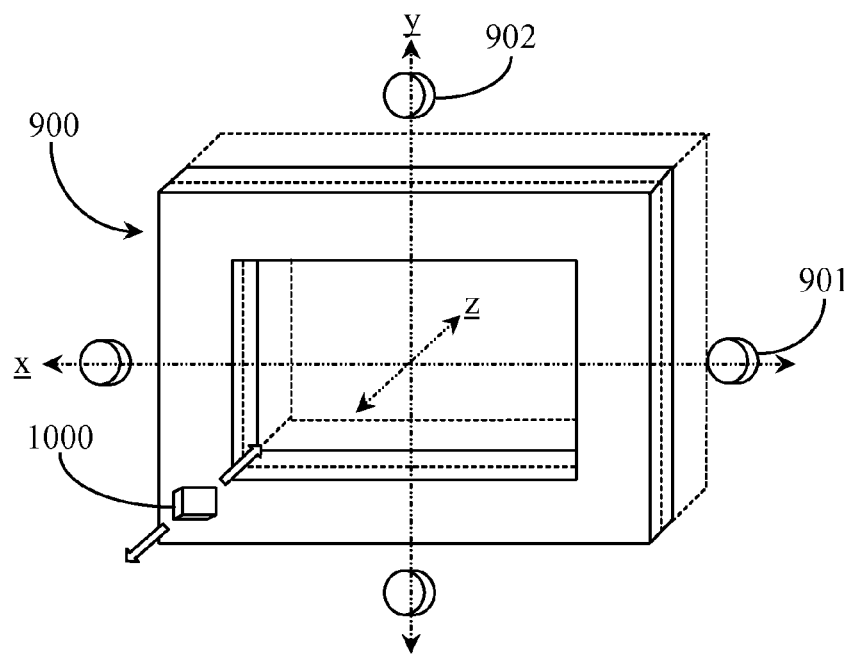
FIG. 10 is a perspective view of window frame resized according to an embodiment of the invention.

FIG. 9 is a perspective view of a window frame atomic object 900 with resizing handles 901 and 902 according to an embodiment of the present invention. FIG. 10 is a perspective view of window frame 900 resized according to an embodiment of the invention. Referring now to FIG. 9, atomic object 900 is a window frame having an overall length, an overall height, and an overall depth or thickness dimension. In this example resizing handle 901 allows resizing along the X axis and resizing handle 902 allows resizing along the Y axis. In this example the window frame may be resized along the X and Y axes but not along the Z axis. The depth of the window frame then will remain constant. The central opening of the window frame is bound to the overall dimensions of the window frame in this example, and its dimensions may change proportionally, or be constrained in some other way.

Referring now to FIG. 10, window frame 900 is resized along the X axis creating a longer window frame with a longer central opening, which remains proportional in dimension to the overall dimensioning of the frame. In one embodiment an auxiliary resizing operation may be performed on window frame 900 to modify the depth of the frame. An auxiliary resize handle 1000 is provided at one corner of the central opening of window frame 900 and may be manipulated generally along the Z axis of the frame in the direction of the arrows to change the depth of the frame. Optional depth adjustments are illustrated by broken boundaries one showing a frame with more depth and one showing a frame with less depth.

Figure 11:
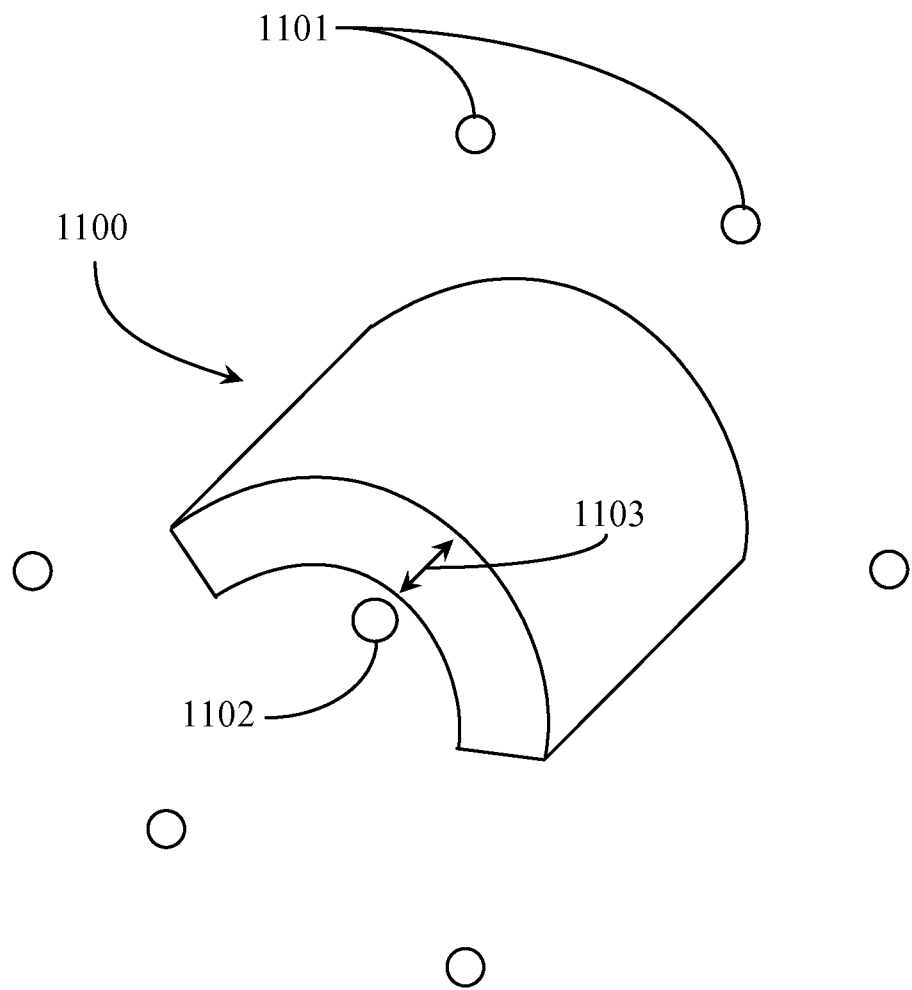
FIG. 11 is a perspective view of an atomic object having both axial resizing handles and an auxiliary resizing handle for changing thickness.

FIG. 11 is a perspective view of an atomic object 1100 having both axial resizing handles and an auxiliary resizing handle for changing thickness. Object 1100 is in the form of a one-third pipe having arcurate major surfaces and straight edges. Axial resizing handles 1101 enable resizing of object 1100 along all three axes. An auxiliary resizing handle 1102 allows a user to change the depth of the channel or more particularly the uniform thickness (illustrated by dimension arrow 1103) of the part. Thickness 1103 may be made greater or smaller by manipulating handle 1102 in either direction of the Z axis in this case. It is important to note herein that each modification of an atomic object carries results that may affect one or more physical properties of the object including how the object will join to another object. These considerations are dynamically calculated during physics simulation and optimized to reduce the potential for error in object modification and in object assembly. For example, rotation of an atomic object with a four-hole bolt pattern that fits onto a surface with an eight hole bolt circle may be performed to 0, degrees, 90 degrees, 180 degrees or 270 degrees and still enable successful joining.

A set of atomic objects with parameterized geometries may be created for a build game and may represent generic objects for use in playing the build game. A user may modify one or more of the parameterized objects to create a larger set of parameterized objects for other users to work with. Tools may also be provided for advanced users to create new parameterized objects and to parameterize those objects according to existing rules relative to surface geometries and allowable modification options.

It will be apparent to one with skill in the art that the atomic object modification system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the descriptions without departing from the spirit and scope of the present invention.

What is claimed is:

1. A system comprising:
   a network-connected computerized appliance coupled to a data repository; and
   software executing on the computerized appliance from a non-transitory medium, the software providing a building game comprising:
   a set of selectable atomic three-dimensional objects, each having a specific size and shape and one or more join features enabling joining to other atomic objects having a compatible join feature;
   a function enabling a user to select a surface on a selected atomic three-dimensional object, and to rotate the surface about either or both of two axis using handles provided on or near the surface, rotation of the surface changing shape and dimensions of the atomic three-dimensional object;
   a function enabling a user to resize a selected atomic three-dimensional object either larger or smaller using handles provided on or near the atomic three-dimensional object;
   a function enabling a user to translate, rotate and join selected atomic three-dimensional objects to construct more complex objects that combine one or more atomic objects, wherein in rotation specific rotation increments are enforced to ensure that the compatible join features properly align for join; and
   a physics simulation engine tracking and changing physical properties of both the atomic objects as the atomic objects are selected, changed in shape and size, effecting their physical properties, and complex objects assembled from atomic objects, and providing physics simulation of all objects during play of the game.

2. The system of claim 1 wherein resize amount is controlled by sticky integer.

3. The system of claim 2 wherein resize amount is limited to a subset of integer values corresponding to parts that are available in the virtual environment.

4. The system of claim 1 wherein trigonometric calculations are made to complete object dimensioning during surface rotation to maintain one or more original symmetry features of the object.

5. A method comprising steps:
   (a) selecting in an interactive interface provided by software executing from a non-transitory medium on a network-connected game server proving a building game, a first atomic three-dimensional object from among a plurality of atomic three-dimensional objects provided for a user to create more complex objects;
   b) altering one or both of the shape and size of the selected first object, using handles provided by an editing function of the software;
   (c) selecting a second atomic three-dimensional object from the plurality of atomic three-dimensional objects;
   (d) positioning the atomic objects for a join operation using manipulation functions provided by the software, wherein rotation of the objects is constrained to specific increments to ensure that compatible join features align properly for join;
   (e) joining the atomic objects at the compatible join features provided on each of the atomic objects, forming a complex object; and
   (f) tracking and changing physical properties of the atomic objects and providing physics simulation of the atomic objects by a physics simulation engine during alteration and join operations, and providing physics simulation of any complex object resulting from a join operation during play of the game.

6. The method of claim 5 wherein resize amount is controlled by sticky integer.

7. The method of claim 5 wherein in step (b) resize amount is limited to a subset of integer values corresponding to parts that are available in the virtual environment.

8. The method of claim 5 wherein trigonometric calculations are made to complete object dimensioning during surface rotation to maintain one or more original symmetry features of the object.

* * * * *